United States Patent [19]

Stemme et al.

[11] 4,179,028

[45] Dec. 18, 1979

[54] CASING

[75] Inventors: Otto Stemme, München; Peter Lermann, Narring; Dieter Engelsmann, Unterhaching; Werner Went, Leverkusen, all of Fed. Rep. of Germany

[73] Assignee: AGFA-Gevaert, A.G., Leverkusen, Fed. Rep. of Germany

[21] Appl. No.: 928,414

[22] Filed: Jul. 26, 1978

[30] Foreign Application Priority Data

Jul. 29, 1977 [DE] Fed. Rep. of Germany ....... 2734322

[51] Int. Cl.² .............................................. B65D 85/67
[52] U.S. Cl. ...................................... 206/316; 206/53; 206/389
[58] Field of Search ................. 206/316, 389, 53, 409; 242/71.1, 71.7; 354/275

[56] References Cited

U.S. PATENT DOCUMENTS 2,575,960  11/1951  Huntington ........................... 206/409
3,752,302  8/1973  Branibar ............................... 206/316

Primary Examiner—William T. Dixson, Jr.
Attorney, Agent, or Firm—Michael J. Striker

[57] ABSTRACT

A casing, particularly for roll film cartridges, includes a hollow housing having a chamber for closely receiving a film cartridge and a channel which communicates with the chamber. The channel is operative for receiving a length of roll film which extends out of the cartridge when the latter is inserted into the chamber. The channel extends tangentially to the chamber and has at least one flat inner surface along which the length of roll film can extend to be held in flat condition.

27 Claims, 3 Drawing Figures

CASING

BACKGROUND OF THE INVENTION

The present invention relates to roll films, and more particularly to casings for roll film cartridges.

It is known in the art that roll film spools are usually furnished in a cylindrical cartridge which has a tangential opening. For storage and transportation the cartridge is installed in a small cylindrical casing with a screw cover. A portion of the roll film extends out of the cartridge and is wound around the latter. When the cartridge is inserted into the casing, the portion of the roll film which is wound around the spool is obviously subject to rather strong bending forces which considerably deform (i.e. curve) the above-mentioned film portion. Such a deformation considerably complicates the use of the film in cameras provided with an automatic film threading arrangement.

SUMMARY OF THE INVENTION

It is a general object of the present invention to avoid the disadvantage of the prior art.

More particularly, it is an object of the present invention to provide a casing for roll film cartridges, in which the beginning portion of the roll film, the portion which extends out of the cartridge, can be kept flat so as to avoid any deformation of this portion.

In pursuance of these objects and others which will become apparent hereafter, one feature of the present invention resides in providing a casing which includes first wall means defining a hollow housing which has a chamber adapted for closely receiving a film cartridge therein. Second wall means bound a channel which communicates with the chamber. The channel is operative for receiving a length of roll film extending out of the cartridge when the latter is inserted into the chamber. The channel extends substantially tangentially to the outer surface of the cartridge and has at least one flat inner surface along which the length of roll film can extend so as to be kept in flat condition.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
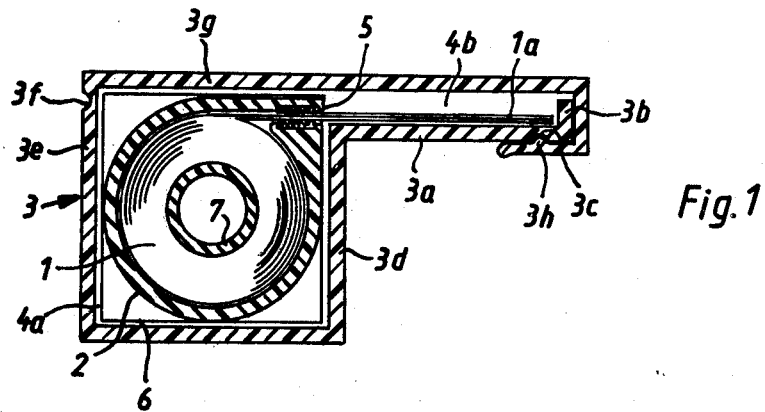
FIG. 1 is a cross-section through a casing, in accordance with the present invention.

Referring now to the drawings, and first to FIG. 1 thereof, it may be seen that the reference numeral 1 designates a roll film accommodated in a cartridge 2. The roll film 1 has a leading end portion 1a which extends out of the cartridge 2. In the prior art this portion 1a is subject to relatively large bending forces due to being bent around the cartridge when the same is inserted into the conventional cylindrical casing.

It is a very complicated procedure to use such a roll film 1, when the end portion 1a is curved, in conjunction with automatic take-up means including, for example, a pair of sprocket wheels for displacing the film in a camera. A situation is very likely to occur, where the end portion may arch (i.e. flex) into the film window and thus prevent its insertion into the take-up chamber of the camera, thereby preventing normal functioning of the automatic displacing means.

In order to prevent any curvature of the end portion 1a of the roll film 1 the present invention provides a novel casing 3 for roll film cartridges.

The casing 3 comprises a hollow chamber 4a, which is operative for receiving the cartridge 2 therein. The interior of the chamber 4a is at least slightly larger than the outer cross-section of the cartridge 2, thus ensuring that the cartridge 2 is closely received in the chamber 4a. The casing 3 is further provided with a channel 4b which communicates with the interior of the chamber 4a. The channel 4a extends tangentially with regard to the cartridge 2 installed in the chamber 4a. The cartridge 2 is so arranged in the chamber 4a, that the opening 5 communicates with the channel 4b. Thus, the channel 4b serves as an enlarged extension of the opening 5 of the cartridge 2. Such a construction renders it possible to accommodate the portion 1a in the channel 4b. Due to the flat orientation of the portion 1a in the channel 4b any possible curvature of the portion 1a is avoided.

In accordance with FIG. 1, the chamber 4a has a square cross-section. The walls of the chamber 4a are integrally connected to those of the channel 4b. The casing 3 can be made of synthetic plastic material. The chamber 4a has side walls 3e and 3d and a bottom wall 3i connecting the side walls. A bottom wall 3a of the channel 4b extends substantially normal to the wall 3d. The upper wall 3g of the channel 4b is integrally connected to the side wall 3e of the channel 4a, and at the other side extends normal to the bottom wall 3a. The bottom wall 3a is provided with a bent portion 3b and a recess 3c operative for receiving a corresponding projection 3h provided on the inner surface of the bent portion of the upper roll 3g, thus bounding the interior of the casing 3. The end portion of the wall 3e is provided with a recess 3f. The closing wall 3g is spaced from the wall 3d by a distance defining the interior of the channel 4b. The cartridge 2 has to be so accommodated in the chamber 4a, as to arrange the opening 5 thereof in communication with the channel 4b. In order to arrange the cartridge 2 in a desirable position, the chamber 4a is provided with a disc 6 mounted on the bottom surface of the chamber 4a. The disc 5 has a recess of a desirable configuration for receiving therein the cartridge 2. The disc 6 is made of synthetic plastic material, for example hard foam.

Figure 2:
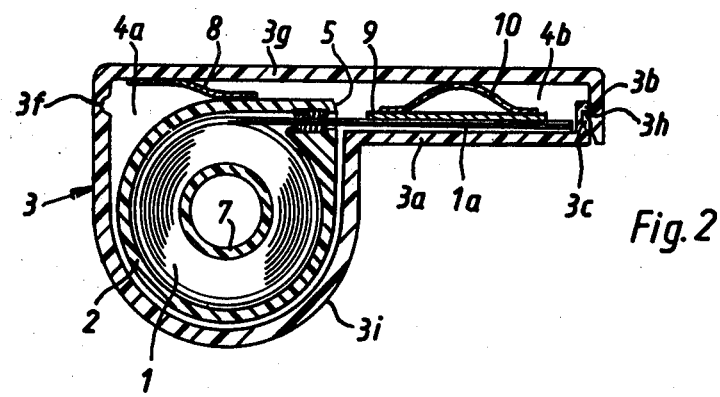
FIG. 2 is a cross-section through another embodiment of the casing.
Figure 3:
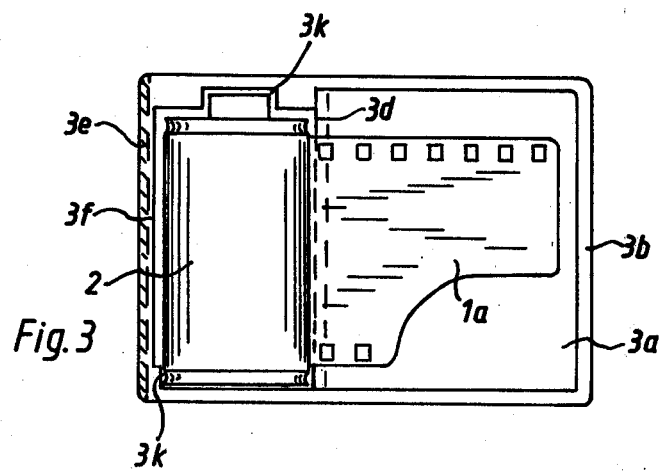
FIG. 3 is a plan view of the casing shown in FIGS. 1 and 2 with the cover of the casing removed.

Another embodiment shown in FIG. 2 differs from that shown in FIG. 1 only in that the portion of the wall of the casing 3 between the flat surface 3a and the recess 3f has a configuration corresponding to that of the outer surface of the cartridge 2. In order to retain the cartridge 2 in its desirable position, the closing wall 3g is provided with at least one weak spring 8. The spring 8 is so arranged as to retain the cartridge 2 in the desired position when the opening 5 is directed into the channel 4b. The channel 4b is further provided with a plate 9 for pressing the portion 1a of the roll film towards the flat inner surface of the wall 3a. The plate 9 extends parallel to the wall 3a. The plate 9 is provided with another weak spring 10 which is engaged with the inner surface of the wall 3g. All these elements 8, 9 and 10 can be of synthetic plastic material, and integrally connected with the casing 3.

The length of the channel 4b is so chosen, as to render it possible for the portion 1a of the film 1 to lie flat in this channel. The length of the portion 1a is chosen to expose some of the film perforations for engagement by the film displacing arrangement of a camera. Such displacing arrangement may include a sprocket wheel, or a film gripping device. When the camera is closed the film displacing arrangement can displace the portion 1a of the film 1 without any problem, advancing this portion through a clearance into the winding chamber onto a take-up spool.

It is to be understood that many modifications may be made which have not been separately disclosed, for the sake of simplicity of the drawings. Thus, for example, the closure 3g may be made separable from the rest of the casing 3 or connectable with the casing through hinges. Besides that, the closure can also be provided on the wall 3e of the casing 3 shown in FIG. 1. If this is the case, the cartridge 2 and the portion 1a have to be correspondingly arranged relative to the channel 4b. In order to avoid any errors in positioning the cartridge 2 the chamber 4a can be provided on its side faces with recesses 3k which are operative for receiving the ends of the cartridge. The recesses can be of any different form and dimensions depending on those of a cartridge.

It will be understood that each of the elements described above, or two or more together, may also find a useful application in other types of constructions differing from the types described above.

While the invention has been illustrated and described as embodied in a casing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A casing, particularly for roll film cartridges, comprising first wall means defining a hollow housing having a chamber adapted for closely receiving a film cartridge therein; and second wall means bounding a channel communicating with said chamber and operative for receiving an end portion of roll film which extends out of the cartridge when the latter is inserted into said chamber, said channel extending substantially tangentially to the outer surface of said cartridge and having at least one flat inner surface along which the end portion of roll film can extend.

2. A casing as defined in claim 1, wherein said channel has a predetermined length which is substantially equal to that of the desirable length of said end portion.

3. A casing as defined in claim 2, wherein said channel extends in a direction coincident with that of the opening of the cartridge when the latter is inserted into said chamber.

4. A casing as defined in claim 3, wherein said channel has a width, as considered in direction normal to the elongation of said channel, which slightly exceeds that of the opening of the cartridge.

5. A casing as defined in claim 4, wherein said chamber comprises a first wall extending substantially normal to the elongation of the opening when said cartridge is inserted in said chamber.

6. A casing as defined in claim 5, wherein said one flat inner surface extends substantially normal to said wall of the chamber.

7. A casing as defined in claim 6, wherein said second wall means comprise a first wall provided with said one flat inner surface and a second wall spaced from said first wall by a distance defining said channel.

8. A casing as defined in claim 7, wherein said chamber comprises a second wall spaced from said first wall by a distance defining said chamber and extending parallel to said first wall.

9. A casing as defined in claim 8, wherein said second wall of the channel is connected with said second wall of the chamber, thereby closing said chamber from above.

10. A casing as defined in claim 9, wherein said second wall of the channel is integrally connected to said second wall of the chamber.

11. A casing as defined in claim 10, wherein said first wall of said channel is integrally connected to said first wall of said chamber.

12. A casing as defined in claim 11, wherein said second wall of said channel extends substantially parallel to said first wall of said channel.

13. A casing as defined in claim 12; further comprising means for retaining said cartridge in a desired position in said chamber.

14. A casing as defined in claim 13, wherein said retaining means comprise a spring having one end mounted on the inner surface of said second wall of the channel and another end engaging the outer surface of said cartridge when the latter is inserted into said chamber.

15. A casing as defined in claim 14, wherein said spring is adapted to retain the cartridge in a position in which the opening of the latter is directed into said channel.

16. A casing as defined in claim 15; further comprising means for preventing any undesirable curving of said end portion of roll film in said channel when said cartridge is inserted into said chamber.

17. A casing as defined in claim 16, wherein said preventing means comprise a plate engaged with at least a part of said end portion and urging the latter towards said flat inner surface of the first wall of said channel.

18. A casing as defined in claim 17, wherein said preventing means further comprise resilient means urging said plate into engagement with said part when said cartridge is inserted into said chamber.

19. A casing as defined in claim 18, wherein said resilient means is a spring mounted on a side of the plate opposite to that engaged with said part of the film end portion and engaged with said second wall of said channel to thereby urge said plate in direction towards said first wall of said channel.

20. A casing as defined in claim 19; further comprising means for adjusting said cartridge in said chamber.

21. A casing as defined in claim 20, wherein said adjusting means comprise at least two recesses spaced along the width of the chamber one from another by a distance defining a desirable position of the cartridge when the latter is inserted into said chamber.

22. A casing as defined in claim 21; further comprising means for defining a position of the cartridge in the chamber as considered in the longitudinal direction of said end portion.

23. A casing as defined in claim 22, wherein said defining means comprise a member mounted in said chamber and having a central hole for receiving a shaft of said cartridge when the latter is inserted into said chamber.

24. A casing as defined in claim 23, wherein said member is a disc having a cross-section corresponding to that of said cartridge.

25. A casing as defined in claim 24, wherein said disc is of synthetic plastic material.

26. A casing as defined in claim 25, wherein said disc is of hard foam.

27. A casing as defined in claim 26, wherein said disc has an outer configuration corresponding to the inner configuration of said chamber.

* * * * *